Figure 3:
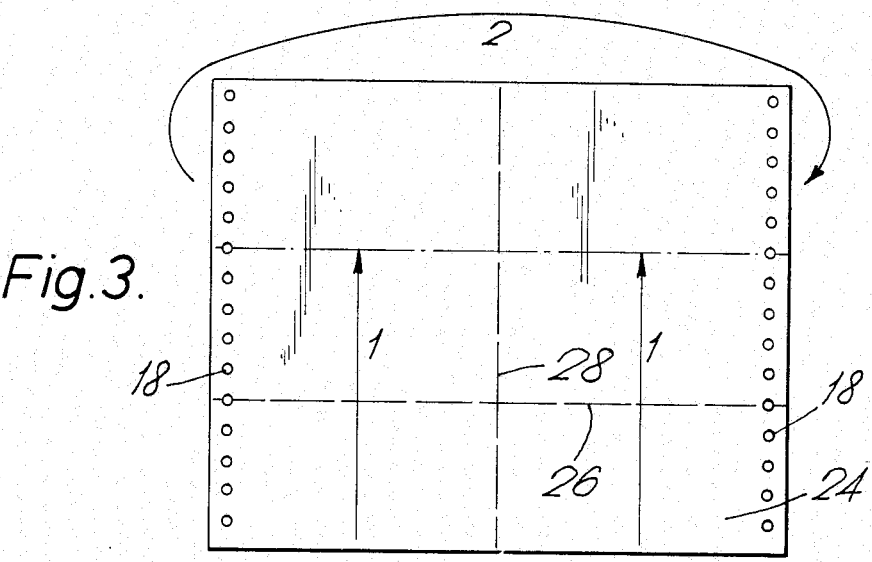

United States Patent [19]

Brindle

[11] Patent Number: 4,508,366

[45] Date of Patent: Apr. 2, 1985

[54] HOLDERS FOR COMPUTER DISKS AND THE LIKE

[75] Inventor: Robert J. Brindle, Witney, England

[73] Assignee: James Burn International Limited, England

[21] Appl. No.: 439,075

[22] Filed: Nov. 4, 1982

[30] Foreign Application Priority Data

Nov. 23, 1981 [GB] United Kingdom ............... 8135239
Jan. 12, 1982 [GB] United Kingdom ............... 8200752

[51] Int. Cl.³ .................. B42D 3/12; B42D 3/18; B65D 85/57; B42F 5/00
[52] U.S. Cl. ........................................ 281/36; 281/2; 206/309; 40/405
[58] Field of Search ................ 281/31, 33, 38, 46, 281/2; 206/309, 311, 312, 313, 232, 444; 229/87 R; 248/459; 283/65; 40/405

[56] References Cited

U.S. PATENT DOCUMENTS

| 680,350 | 8/1901 | Parmelee | 281/5 |
|---|---|---|---|
| 1,405,134 | 1/1922 | Hoyme | 281/31 X |
| 1,488,616 | 4/1924 | Robbins | 281/46 X |
| 1,683,479 | 9/1928 | Nystrom | 206/311 X |
| 1,912,710 | 6/1933 | Kennedy | 281/31 |
| 2,799,391 | 7/1957 | Eisner | 281/31 X |
| 3,537,728 | 11/1970 | Reese | 281/31 |
| 3,680,969 | 8/1972 | Gorman | 281/31 X |
| 4,014,120 | 3/1977 | Merz | 248/459 X |
| 4,126,333 | 11/1978 | Dickinson | 281/38 X |

FOREIGN PATENT DOCUMENTS

| 129462 | 8/1932 | Austria | 40/405 |
|---|---|---|---|
| 0020166 | 10/1980 | European Pat. Off. | 281/33 |
| 341146 | 1/1931 | United Kingdom . | |
| 342912 | 2/1931 | United Kingdom . | |
| 822305 | 10/1959 | United Kingdom | 206/311 |
| 1312778 | 4/1973 | United Kingdom . | |

Primary Examiner—Paul A. Bell
Assistant Examiner—Paul M. Heyrana, Sr.
Attorney, Agent, or Firm—Wood, Herron & Evans

[57] ABSTRACT

A new page type holder adapted to store, e.g., computer disks. A finished page of the disk holder is generated from a single oversize piece of paper in order to provide a desired finished size page with at least one disk pocket on both the front and back face thereof. The disk pockets on the page are established by the overlying relation of the oversize unfolded page's top edge or bottom edge portions in combination with a binding element that (a) holds all finished pages and covers together one with the other in book configuration, and (b) holds each folded page together to define one side edge of the pockets on that page. The other side edge of the pockets, and the bottom edges of the pockets, on the finished page are defined by the folded configuration of the oversize unfolded page when it is in the finished page form.

8 Claims, 7 Drawing Figures

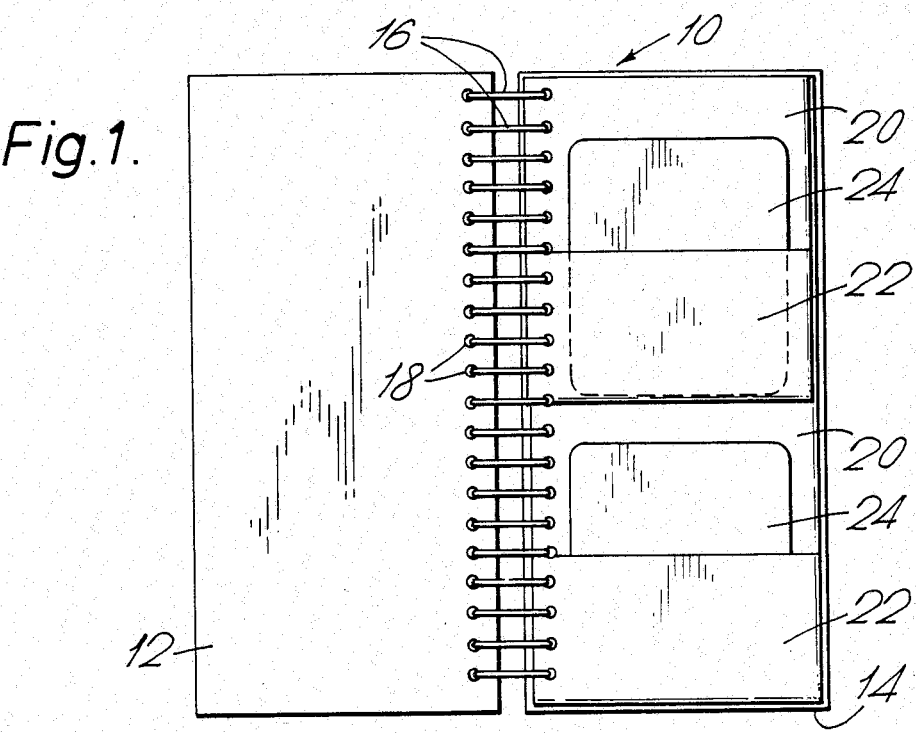
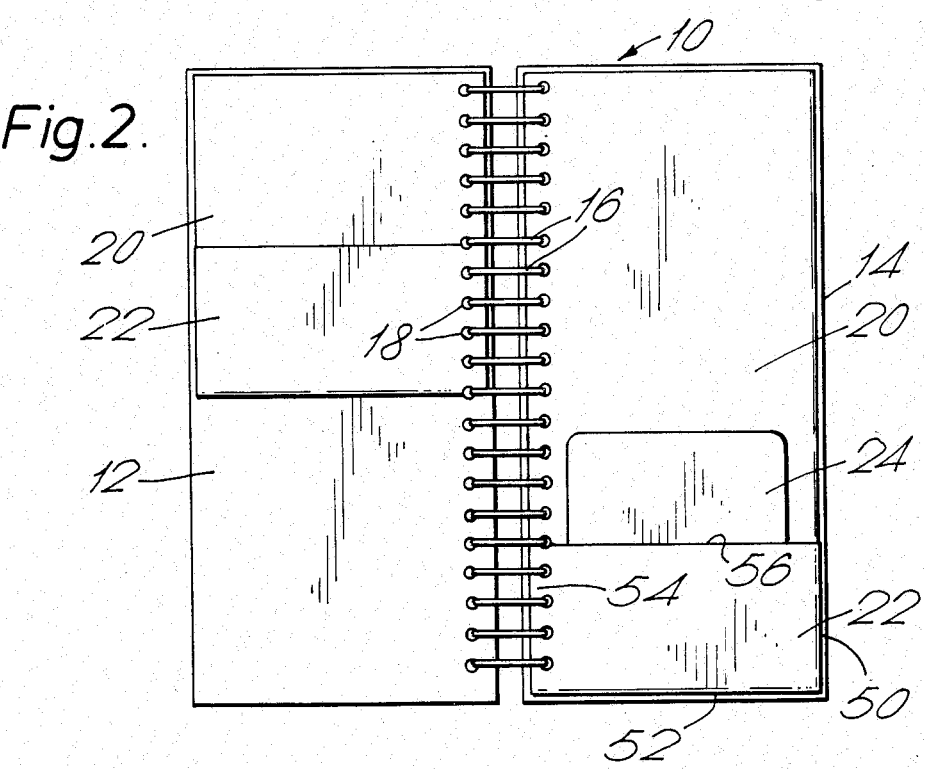

HOLDERS FOR COMPUTER DISKS AND THE LIKE

This invention relates to holders for disks such as computer disks.

Certain types of disks, e.g. computer or information disks, should be stored so that they are easily accessible but yet protected. This may be achieved by the use of a holder having a number of pages each provided with a pocket into which a disk may be placed.

According to the invention a disk holder comprises a number of pages bound by a mechanical binding element (which for example may be a plastic comb type binding or preferably is of wire), at least some of the pages being provided with pockets to receive disks. The holder preferably has stiff covers and an additional cover member may be included with its lower edge cut at an angle, to act as a support when the holder is opened and stood in a substantially upright position on the lower edges of the covers.

A pocket may be formed by turning up the bottom edge of a page, preferably a double page. Alternatively or additionally, a pocket may be formed by either turning down the top portion of a page and then turning up the bottom part of that turned down portion, or turning down a short top portion and then turning down, in the opposite direction, a larger top portion. In either case the upturned portion is held in position by use of the wire binding element.

The wire binding element is conveniently that known under the registered Trade Mark WIRE-O produced by James Burn Bindings Limited.

Preferably, the intermediate pages either alternatively have a pocket in their top half and a pocket in their bottom half or have a pocket in both the top and bottom half of a single page. This prevents "bunching" of the disks in the holder by even distribution of the disks in the holder.

Preferably one side of the pocket(s) on the page is "closed" by the folding of the page along the longitudinal median line while the other side of the pocket(s) is "closed" by the binding element. The base of the pocket(s) is also "closed" as the pocket is formed by turning up the bottom edge of a page, while the upper lip of the pocket(s) is "open" such that disks can be placed into the pocket.

The holder preferably also contains further plain pages with no pockets for recording and information purposes.

Figure 4:
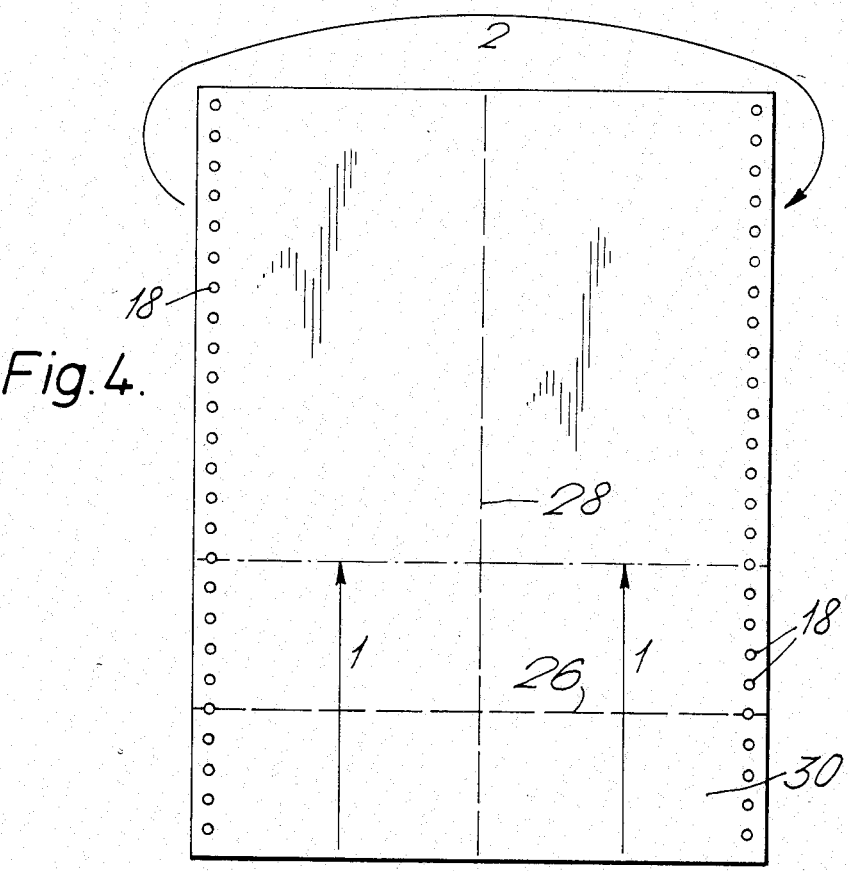
Figure 5:
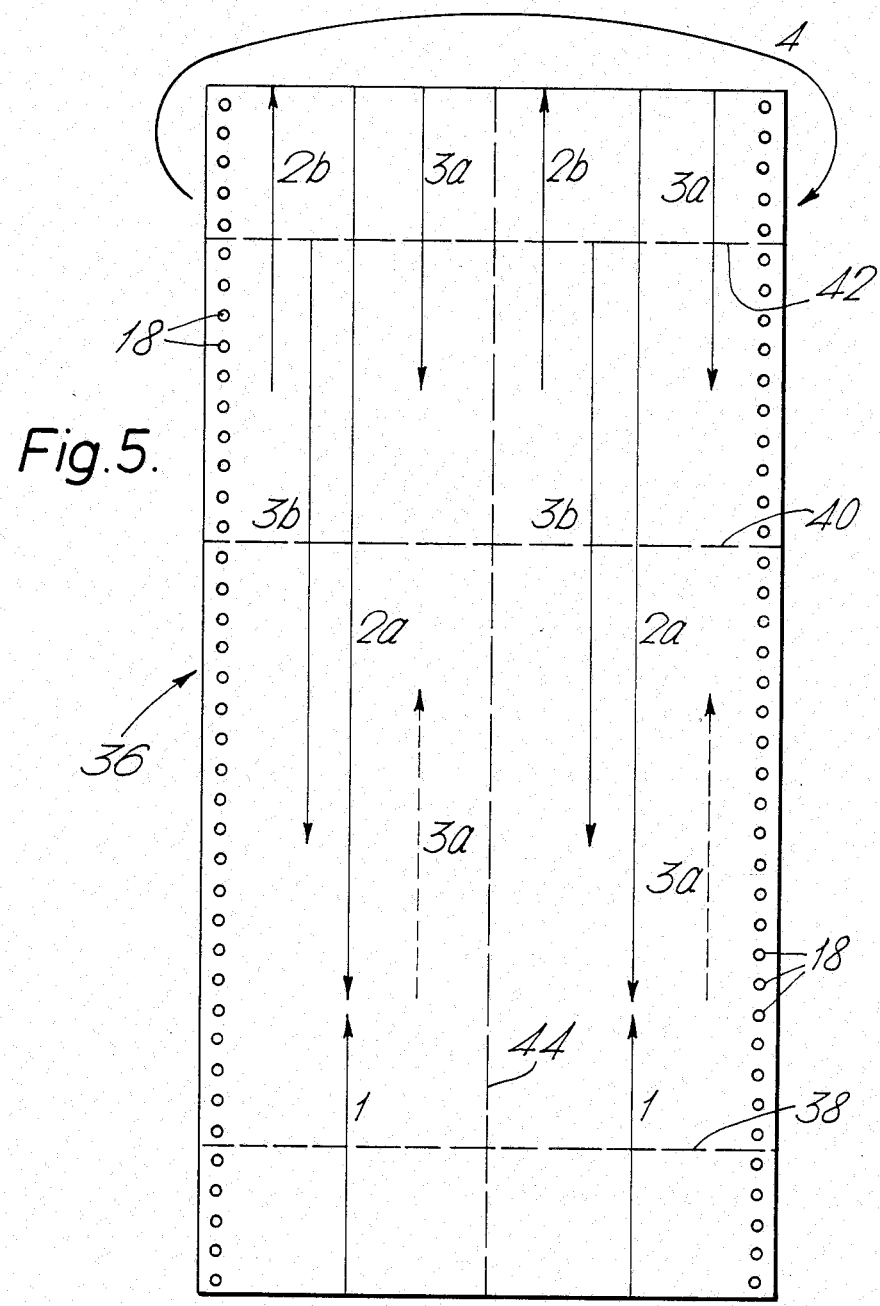
Figure 6:
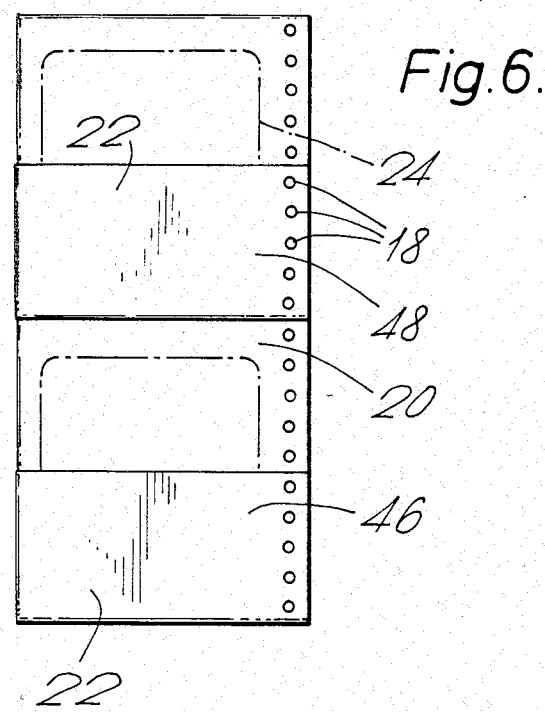
Figure 7:
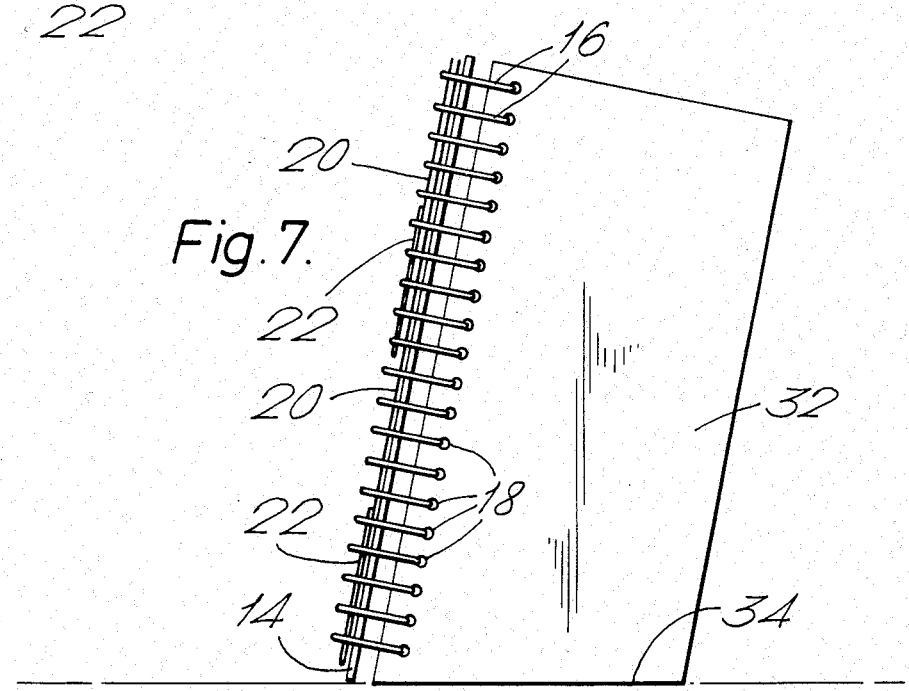

The invention will now be described, by way of example, with reference to the accompanying drawings in which:

FIG. 1 is a view of one embodiment of a holder according to the invention in an open position, FIG. 2 is a view similar to FIG. 1 showing an alternative open position, FIG. 3 is a view of an "unfolded" portion of the holder, FIG. 4 is a view of another "unfolded" portion of the holder, FIG. 5 is a view of an alternative "unfolded" portion of a page of a second embodiment of holder, FIG. 6 is a view of the "folded" page of FIG. 5, and FIG. 7 is a side view of a holder according to the invention in an upright position.

The disk holder 10 shown in FIGS. 1 and 2 comprises a "protective" cover 12 and back page 14 preferably of hard cardboard material, bound by a wire binding element 16 passing through perforations 18 along one side of pages 12 and 14. The wire binding strip 16 is that which is sold under the registered Trade Mark WIRE-O of the kind shown and is described in British Pat. No. 1,460,444.

Between the cover and back pages are a plurality of intermediate pages 20 having a pocket 22 on the front and back faces thereof. Into each pocket a disk 24 may be placed for storage and safely protected and prevented from being bent due to the "protective" cover and back page. The pocket may also serve to cover certain parts of the disk 24 that must not be touched.

The intermediate pages 20 have perforations 18 along one side through which the wire binding element 16 passes and binds the pages with the "protective" pages.

In one alternative, the pages 20 are staggered so as to prevent bunching of stored disks, by alternatively providing a pocket 22 in the top half of the holder and then a pocket in the bottom half of the holder (see FIG. 1). This is achieved by using two types of intermediate pages 20 as shown in FIGS. 3 and 4.

The sheet 24 shown in FIG. 3 includes perforations 18 along two opposite sides. To form an intermediate page 20 the sheet is folded firstly (see arrow 1) along a line 26 transverse to the two opposite sides and secondly (see arrow 2) along a line 28 intersecting the two opposite sides. In other words, the bottom edge of the sheet 24 is turned up along the line 26 (see arrow 1) and the sheet folded along the longitudinal median line 28 (see arrow 2).

The resulting folded sheet defines a pocket, on both the front and back face, "closed" on the side 50 and base 52, and "open" on the other side 54 and lip 56 (see FIG. 2). When the sheet is bound in the holder the pockets are also "closed" on the side 54, the side of the pocket containing the perforations, by the wire binding element 16 passing through the perforations 18. The use of simple folded sheets as shown in FIGS. 3 and 4 is thus useful even though the folding only provides a pocket "closed" on the side 50 and base 52 because the other side 54 is "closed" by the binding element 16.

The sheet 30 shown in FIG. 4 is very similar to sheet 24 except that it is of greater length. This is so that folded sheet 24, when bound in the holder as an intermediate page, provides a pocket in the top half of the holder, while folded sheet 30 when bound in the holder, provides a pocket in the bottom half of the holder.

In the alternative embodiment shown in FIGS. 5 and 6 instead of staggering the pockets on pages 20 by using sheets 24 and 30, a single page 36 may be used which has both a pocket in its bottom and top half. The sheet 36 is folded along line 38 (see arrow 1) and then either folded along lines 40 and 42 in order (see arrows 2a and 3a) or lines 42 and 40 in order (see arrows 2b (note this folded in opposite sense) and 3b). In other words the bottom edge of the sheet 36 is turned up along line 38 (see arrow 1) and then either, the top portion of the sheet 36 is turned down along line 40 (see arrow 2a) and the bottom part of that turned down portion then turned up along line 42 (see arrow 3a), or a short top portion of the sheet 36 is turned down in the opposite sense along line 42 (see arrow 2b) and then a larger top portion turned down along line 40 (see arrow 3b).

The resulting intermediate page 20 (see FIG. 6) thus has both a pocket 46 in the bottom half and a pocket 48 in the top half. This page also prevents "bunching" of the disks in the holder by even distribution of the disks, In a further embodiment (not shown) a similar intermediate page 20 to that formed by sheet 36 can be formed by, using two sheets identical to sheets 24 and 30, folding the sheet 24 about the line 28 and around the top of the folded sheet 30, and attaching the two sheets to the binding element 16. Such an arrangement produces a single page similar to the page 20 formed by sheet 36 and also prevent "bunching" of disks.

The holder 10 may include extra plain pages with no pockets for recording and information purposes and a support page 32 preferably of hard cardboard material. This support page 32 is bound to the holder by the element 16 between the pages 12 and 14 but on the opposite side of the pages 12 and 14 to that of the intermediate pages 20. The support page 32 is cut away at the bottom edge 34 so that the holder 10 may be supported in a sloped upright position to form a T shape in plan view and provide the disks in the pockets 22 in an open display arrangement (see FIG. 7). The cut away at the bottom edge 34 is preferably such that the holder 10 is sloped between 10° to 20° in the upright position.

We claim:

1. A disk holder of book-like configuration, said holder comprising
    a plurality of finished pages, at least one of said finished pages being formed from an unfolded page having a width twice the width of said finished page, said unfolded page also having a length greater than the length of said finished page,
    at least one pocket formed on each of the front and back faces of that one of said finished pages made from said unfolded page, each of said pockets being closed along a bottom edge by folding the excess length of said unfolded page relative to the length of said finished page, and each of said pockets being closed along one longitudinal side edge by folding said unfolded page along a longitudinal median line of said unfolded page, each pocket being sized to receive a disk therein, and
    a binding element that binds together the opposite side edges of said unfolded page after said unfolded page has been folded into finished page configuration with front and back face pockets formed thereon, each of said pockets being closed along another longitudinal side edge by said binding element, and said binding element serving to bind together all finished pages with or without pockets thereon, thereby forming said disk holder.

2. A holder as claimed in claim 1, said holder comprising
    front and back cover members each provided with its lower edge cut at an angle, said cover members acting as a support when the holder is opened and stood in a substantially upright position on the lower edges of said front and back members.

3. A holder as claimed in claim 1, said unfolded page being folded so as to overlie itself to form said pockets on said finished page.

4. A holder as claimed in claim 1, a bottom portion of said unfolded page being folded so as to lie within the periphery of said finished page to form said pockets on the bottom part of said finished page.

5. A holder as claimed in claim 1, a short top section of a top portion of said unfolded page being folded against a longer bottom section of said top portion of said unfolded page, said larger bottom portion being folded so as to lie within the periphery of said finished page to form said pockets on the top part of said finished page.

6. A holder as claimed in claim 1, said holder comprising
    at least two finished pages with pockets therein, one of said finished pages providing its pockets in the top half of said holder and the other of said finished pages providing its pockets in the bottom half of said holder.

7. A holder as claimed in claim 1, said holder comprising
    at least one finished page having at least one pocket in each of the top and bottom halves of said holder.

8. A holder as claimed in claim 1, said holder comprising
    at least one plain finished page with no pocket thereon.

* * * * *